Nov. 15, 1960     P. VAN ZONNEVELD     2,959,894
METHOD OF SEALING GLASS MEMBERS TOGETHER
Filed Sept. 28, 1956     2 Sheets-Sheet 1

INVENTOR.
P. VAN ZONNEVELD
BY
AGENT

Nov. 15, 1960    P. VAN ZONNEVELD    2,959,894
METHOD OF SEALING GLASS MEMBERS TOGETHER
Filed Sept. 28, 1956    2 Sheets-Sheet 2
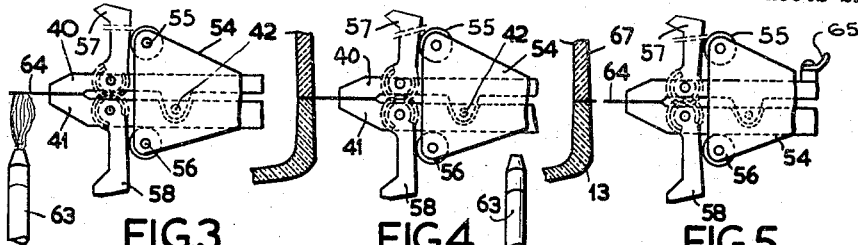
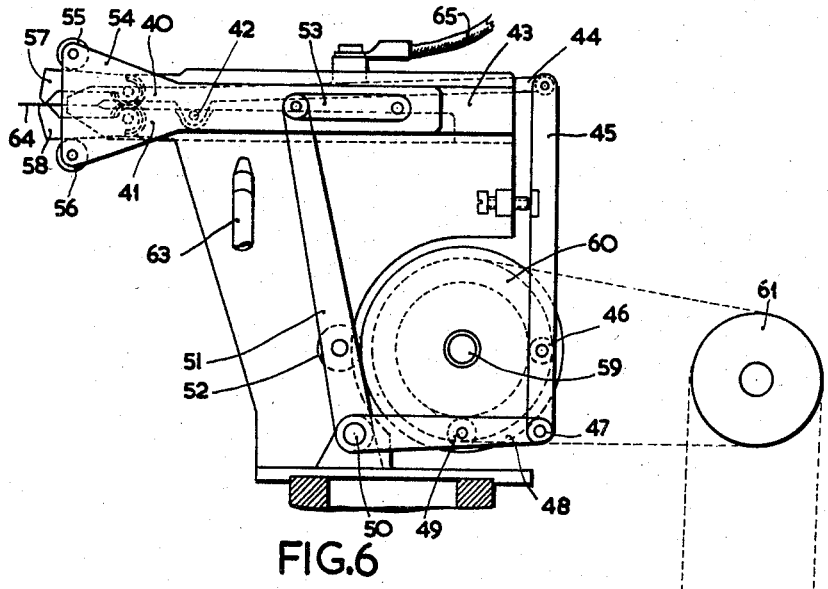
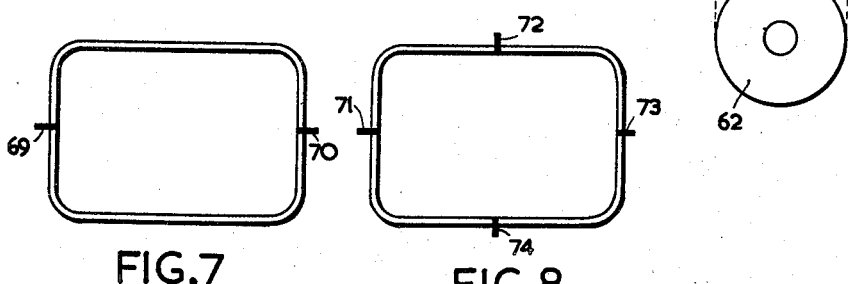
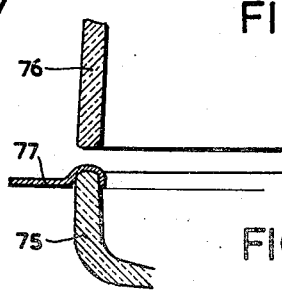
INVENTOR
BY *[signature]*
AGENT United States Patent Office 2,959,894
Patented Nov. 15, 1960

2,959,894
METHOD OF SEALING GLASS MEMBERS TOGETHER

Pieter van Zonneveld, Eindhoven, Netherlands, assignor, by mesne assignments, to North American Philips Company, Inc., New York, N.Y., a corporation of Delaware Filed Sept. 28, 1956, Ser. No. 612,854

Claims priority, application Netherlands Oct. 1, 1955

4 Claims. (Cl. 49—81)

The invention relates to a method of sealing together two glass members, such as the faceplate and cone of a cathode ray tube. It is known that difficulties arise in sealing relatively large glass members together, since it is difficult to heat the glass uniformly at the area of the seal.

The primary object of the invention is to seal glass members together by supplying an electric current through at least two electrodes to the glass after the members have been pre-heated to a temperature at which the resistance of the sealing area of the glass to the electric current is sufficiently low.

In accordance with the invention electrodes are inserted between the members to be sealed together and remain sealed in the glass at least partly after the sealing operation has been terminated. Although the glass members need not move relatively to the electrodes, the members, with the electrodes affixed to them, may rotate together relatively to stationary contacts on which the electrodes ride like trolleys. Current supplied to the electrodes through these trolley-like contacts flows through the heated glass heating it still further to allow the members to be sealed together.

After the electrodes have been sealed in, they may be cut to measure. Consequently, the body manufactured in accordance with the invention has, in the region of the seal, a plurality of metal strips, which have served as electrodes. If the body is constructed as a cathode-ray tube, the metal strips may, in addition, be utilized for other purposes, if they project inwardly in the body, which of course, is not always required. For example, one of the strips in the tube may be used as a conductor to a layer provided on the inner wall of the tube. Or the strips may be used to secure a shadow mask within a color cathode ray tube.

The device for carrying out the method described above is provided with clamping devices for the two objects and with burners to heat the glass members and is characterized in that provision is made of means through which an electric current can be supplied to electrodes between the edges of the members.

In one embodiment of the device the means for supplying the electrodes to the members are combined with the means for supplying the electric current.

The invention will be explained more fully with reference to a few embodiments.

Figs. 3, 4, 5 and 6 show the mechanism for supplying the electric current on an enlarged scale.

Fig. 7 is a plan view of a television tube manufactured in accordance with the invention.

Fig. 8 is a further embodiment of such a tube.

Fig. 9 shows part of the glass members, in which during the heating period, the electrodes are provided.

Figure 1:
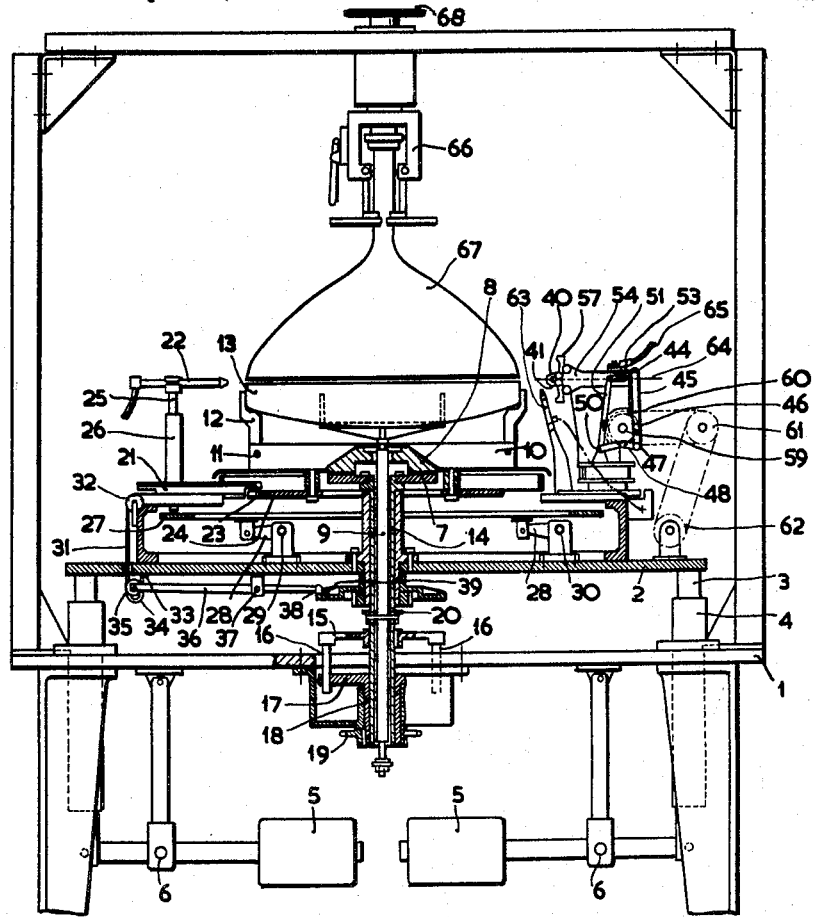
Fig. 1 is a side view of a device for carrying out the method described above, in which part of the table is shown in a sectional view.
Figure 2:
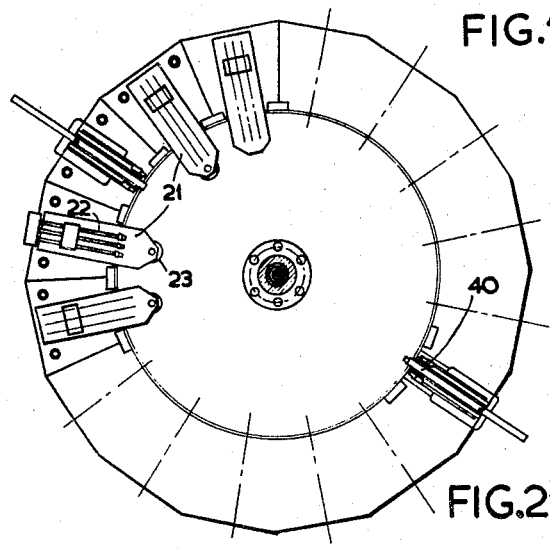
Fig. 2 is a plan view of this table.

The device shown in Figs. 1 and 2 has a frame 1 with a table 2, which is adapted to be moved straightly up and down by means of a plurality of rods 3 in the sleeves 4 of the frame. To the rods 3 are secured a plurality of counter weights 5, of which only two are shown and which are rotatable about a fixpoint 6, so that the table is balanced.

The table 2 has, on the top side, a friction disc 7 and a second friction disc 8, rotatable about a vertical shaft 9, engages the former. The friction disc 8 is provided with a plurality of arms 10, to each of which is secured an arm 12, rotatable about a fulcrum 11, this arm being drawn inwardly by a spring (not shown). Between the arms 12 can be clamped a faceplate, or window, 13 of a television tube.

The friction disc 8 is arranged on a sleeve 14, which is rotatable in the table and which is provided on the lower side with two arms 15 with studs 16. The studs 16 are adapted to be slipped into holes of arms 17 associated with a sleeve 18; the sleeve 18 is provided with a chain wheel 19. The shaft 9 has a shoulder 20, with which co-operates a lever (not shown), so that the friction disc 8 can be disengaged from the friction disc 7.

On the table 2 provision is made of 14 sledges 21, on which are mounted three burners 22, as is shown in Fig. 2. The sledges have rollers 23, which engage a cam disc 24, secured to the friction disc 8. The cam disc 24 has a shape corresponding to the cross-section of the window 13 at right angles to the tube axis. If the cross-section of the window is circular, the cam disc is also circular, so that the sledges with the burners remain always at the same distance from the shaft 14. However, if the window has a more or less rectangular cross-section as is the case with the tube shown in Fig. 7, the cam disc is also more or less rectangular.

The burners 22 are secured to a rod 25, which is adapted to move up and down in a sleeve 25 of the sledge and which bears on the lower side on a disc 27. This disc can be moved up and down by means of levers 28, which are seated on shafts 29 and 30. The shafts 29 and 30 may be turned by the operator in a manner not further described, so that via the disc 27 the burners can be moved up and down.

To each of the sledges 21 is secured one end of a metal tape 31, which is guided over a roller 32 and the other end of which is secured to the table 2. The loop 34 of this tape includes a roller 35 of a lever 36, which is rotatable about a fixpoint 37 and which bears by means of a roller 38 on a dish 39. This dish is rotatable by means of a mechanism (not shown), so that a cam arrives below the roller 38, which is thus moved upwardly, so that the metal tape is drawn downwardly and the burners are moved further backwards. This may be desired to fix the window 13 in the arms 12.

On the table provision is furthermore made, as is evident from Figs. 2 and 6, at two areas of a device to supply electric current. This device is shown in Figs. 3, 4, 5 and 6 on an enlarged scale. The device comprises two pincers 40 and 41; the pincer 40 is rotatable about a point 42 of the pincer 41; the pincers are straight-guided in a holder 43. At the end 44 of the pincer 40 is pivoted a rod 45, which is provided with a roller 46 and which is pivoted at the other end 47 to a lever 48, provided with a roller 49 and rotatable about a fixpoint 50. About this point 50 is also rotatable a lever 51 with a roller 52. This lever is connected via a lever 53 with the yokes 54, provided on the sides of the pincers 40 and 41; these yokes have an upper roller 55 and a lower roller 56. On the pincer 40 is pivoted a cutting member 57 and on the pincer 41 a cutting member 58. These cutting members are always drawn into the open position by springs (not shown), as is evident also from Fig. 1. The rollers 46, 49, 52 engage each an individual cam; these cams are seated on a shaft 59. On this shaft is also seated a chain wheel 60, which can be driven by the chain wheel 62 via two chain wheels 61, of which only one is shown in the figure. A burner 63 is provided to heat the metal strip 64, provided between the pincers 40 and 41. By means of the cable 65 electric current can be supplied to the pincer 40 (Fig. 6).

On the top side of the device provision is made of a holder 66, in which a cone 67 of a television tube can be clamped. By means of a chain wheel 68 this holder is rotatable; care should be taken that both the window 13 and the cone 67 rotate with the same speed.

The device operates as follows:

In the holder is arranged a cone 67 and between the arms 12 is arranged a window 13; by correctly shaping the arms 12, the window will occupy the desired position relative to the cam disc 27. As is evident from the figure, a gap is left between the cone 67 and the window 13. Since the rod 9 occupies the lifted position, the friction clutch between the discs 7 and 8 is disengaged, so that the cone 67 may be positioned correctly relatively to the window 13. Then the discs 7 and 8 are moved to engage one another and the window and the cone are rotated with the same speed. The burners 22 provide the heat and, owing to the shape of the cam 24, they are always at the same distance from the cone and the window. The height of the burners may be adjusted accurately by means of the ring 27, which is displaceable by turning the shafts 29 and 30.

After the objects have been heated for some time, so that they have both assumed a temperature at which the glass has the desired low resistance for the electric current, the electrodes which are preheated by the burners 63, may be arranged between the cone and the window. To this end the rotation of the two objects is stopped. The heating of the electrodes is illustrated in Fig. 3. The electrode is then moved to the left, since the pincers 40 and 41 hold the electrode 64 and the lever 45 is moved to the left by turning it about the point 47. The electrode 64 then lies between the two objects, after which the window 13 is moved upwardly by displacing the shaft 9 the strips being clamped tight as is indicated in Fig. 4. Then the pincers 40 and 41 disengage the strip 64 owing to the displacement of the lever 48, which rotates about the point 50. Moreover, the pincers are drawn to the right, since the lever 45 is turned to the right. The pincers 40 and 41 then re-engage the metal strip 64, as is shown in Fig. 5; this is carried out by moving the lever 48 again upwardly, since the roller 49 runs off the associated cam.

By supplying the electric current via the cable 65, the cone and the window are sealed together; it may be desirable to move the window slightly up and down relatively to the cone, which may be effected by means of the shaft 9. When the objects have been sealed together, the lever 51 is moved to the left, this lever then turning about the point 50. The yoke 54 is then also moved to the left, so that the cutting members 57 and 58 can rotate and fall forwardly, as is shown in Fig. 6. The strip 64 is thus cut off and part of the strip remains in the weld. Then the pincers 40 and 41 are moved slightly further to the outer side.

By moving the burners 22 as far as possible to the outer side, which may be carried out by means of the lever rotating about the point 37, the burners are removed, as is evident from Fig. 1. The television tube may then be removed from the device.

Fig. 7 is a plan view of a television tube, in which two electrodes 69 and 70 are sealed in.

With the tube shown in Fig. 8 use is made of four electrodes 71, 72, 73 and 74. By supplying the current in succession to two consecutive electrodes, the glass can be prevented from assuming a higher temperature at one area than at another, which might occur in the device shown in Fig. 7.

In the device shown in Figs. 1 to 6 the electrodes are not supplied to the objects until the latter have been sufficiently heated by gas burners. As an alternative, the electrodes may be arranged on the objects prior to the heating, the electrodes being thus heated simultaneously to the desired temperature. Fig. 9 shows part of the window 75 and part of a cone 76. Around the edge of the window is provided a metal strip 77, to which electric current can be supplied, after the objects and the strip have been sufficiently heated.

It should be noted that it is of importance with the method described above to choose a composition of the metal for the aforesaid electrodes which has a coefficient of expansion corresponding at least substantially with that of the glass; this composition is frequently used in the glass industry. The method described above may be used also successfully for the manufacture of hollow glass bricks.

What is claimed is:

1. A method of sealing together two glass members comprising the steps, inserting at least two electrodes between and coextensive with opposing surfaces of the glass members, bringing the glass members together to secure the electrodes between the glass members, preheating the glass members to a temperature at which the glass has a relatively low resistance to an electric current, connecting one end of each of said electrodes to a source of electric current to further heat the glass and seal the members together, and thereafter disconnecting the electrodes from said source with the electrodes remaining in the glass.

2. A method of sealing together two glass members comprising the steps, inserting at least three electrodes between and coextensive with opposing surfaces of the glass members, bringing the glass members together to secure the electrodes between the glass members, preheating the glass members to a temperature at which the glass has a relatively low resistance to an electric current, cyclically connecting one end of pairs of said electrodes to a source of electric current to further heat the glass and seal the members together, and thereafter disconnecting the electrodes from said source with the electrodes remaining in the glass.

3. A method of sealing together two glass members comprising the steps, attaching to one of said members on a surface opposite the other member at least two electrodes coextensive with opposing surfaces of the glass members, bringing the glass members together to clamp the electrodes between the glass members, preheating the glass members to a temperature at which the glass has a relatively low resistance to an electric current, connecting one end of each of said electrodes to a source of electric current to further heat the glass and seal the members together, and thereafter disconnecting the electrodes from said source with the electrodes remaining in the glass.

4. A method of sealing together two glass members comprising the steps, inserting at least two electrodes between and coextensive with opposing surfaces of the glass members, bringing the glass members together to secure the electrodes between the glass members, preheating the glass members to a temperature at which the glass has a relatively low resistance to an electric current, connecting one end of each of said electrodes to a source of electric current to further heat the glass and seal the members together, moving the glass members relative to one another while current is being supplied to said electrodes, and thereafter disconnecting the electrodes from said source with the electrodes remaining in the glass.

References Cited in the file of this patent

UNITED STATES PATENTS

| | | |
|---|---|---|
| 1,220,836 | French et al. | Mar. 27, 1917 |
| 2,030,187 | Salzberg | Feb. 11, 1936 |
| 2,074,864 | Salzberg | Mar. 23, 1937 |
| 2,100,703 | Schlesinger | Nov. 30, 1937 |
| 2,177,502 | Stack | Oct. 24, 1939 |
| 2,306,054 | Guyer | Dec. 22, 1942 |
| 2,431,208 | Stone | Nov. 18, 1947 |
| 2,514,878 | Kuperus | July 11, 1950 |
| 2,680,332 | Young | June 8, 1954 |
| 2,867,948 | Zimmerman | Jan. 13, 1959 |